INVENTORS.
DAVID L. BAHRS
JOHN F. COULEUR
PHILIP F. GUDENSCHWAGER
RICHARD L. RUTH
WILLIAM A. SHELLY
BY
ATTORNEY 3,454,931
DATA PROCESSING SYSTEM INCLUDING ADDRESS DEVELOPMENT APPARATUS

David L. Bahrs, Liverpool, N.Y., John F. Couleur, Phoenix, Philip F. Gudenschwager, Scottsdale, and Richard L. Ruth and William A. Shelly, Phoenix, Ariz., assignors to General Electric Company, a corporation of New York Filed June 27, 1966, Ser. No. 560,573
Int. Cl. G11b *13/00;* G06f *1/00, 7/00*
U.S. Cl. 340—172.5 11 Claims

ABSTRACT OF THE DISCLOSURE

A data processing system including a data processor and a memory unit is shown. The processor includes means for providing several different types of address modifications.

Figure 1:
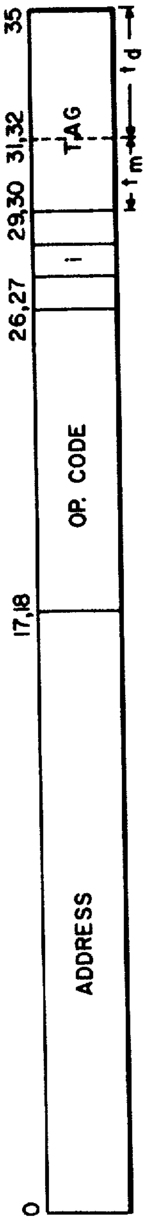

This invention relates generally to data processing systems and, more particularly, to means for providing memory addresses in a data processing system.

In a data processing system which executes a sequence of instruction words called a program to process data, it is often desirable to provide the capability of what is generally referred to as indirect addressing. More correctly, it is desirable to provide for address modification which includes indirect addressing. In address modification, an instruction word, which normally includes an address portion as well as additional data concerning an operation to be performed, is operatively employed with a second type of information item termed an indirect word. These two words, the instruction word and the indirect word, collectively define the total of an operation to be performed with respect to an information item stored in the memory. This latter information item is normally called an operand.

Address modification permits versatility and flexibility in establishing programs for a data processing system and greatly eases the problems of the programmer. Address modification also facilitates the use of certain fundamental concepts by more than one programmer without the inclusion of a great number of details in each of the programs. Additionally, certain types of address modifications permit the traversal of tables (a series of storage locations) by the execution of a single command without the necessity of programmer supervision of each individual step to thus permit what amounts to an automatic search for a specific detail or information item.

Without address modification it is necessary for the programmer to use what is sometimes termed an impure procedure. In an impure procedure, the programmer must modify each instruction used. This prohibits, in a multiprocessor system, the use of a single instruction by more than one program. Thus, an impure procedure does not represent an efficient method of programming. Additionally, by address modification and indirect addressing, a particular memory location may be preselected which will serve to point to a particular type of function and with this knowledge the programmer may proceed to write his program knowing that when he needs this particular type of function he need only reference this preselected location.

While address modification is fairly well developed in the art it has suffered from lack of versatility in the number of ways of developing addresses. Accordingly, it is desirable to extend the usefulness of address modification in a data processing system.

It is, therefore, an object of the present invention to provide an improved address modification apparatus in a data processing system.

It is another object of the invention to extend the address modification capability of a data processing system.

It is a still further object to provide a data processing system embodying new and improved means for address development.

Still another object is to provide a data processing system employing address modification apparatus to ensure greater versatility to the program.

It is a still further object of the present invention to provide a data processing system employing address modification apparatus which permits the modification of the address portion of an information item by a prescribable amount each time that information item is brought from the memory unit.

The foregoing objects are achieved, in accordance with the illustrated embodiment of the present invention by providing an information item which may be indirectly addressed and which contains an address portion and a tag portion which contains a prescribable numerical value. Each time this information item is brought from the memory to the data processing unit, the address portion thereof is varied by the amount contained in the tag portion. This information item may also include a tally portion which counts the number of times the indirect word is brought from the memory unit.

*Drawings*

Figure 2:
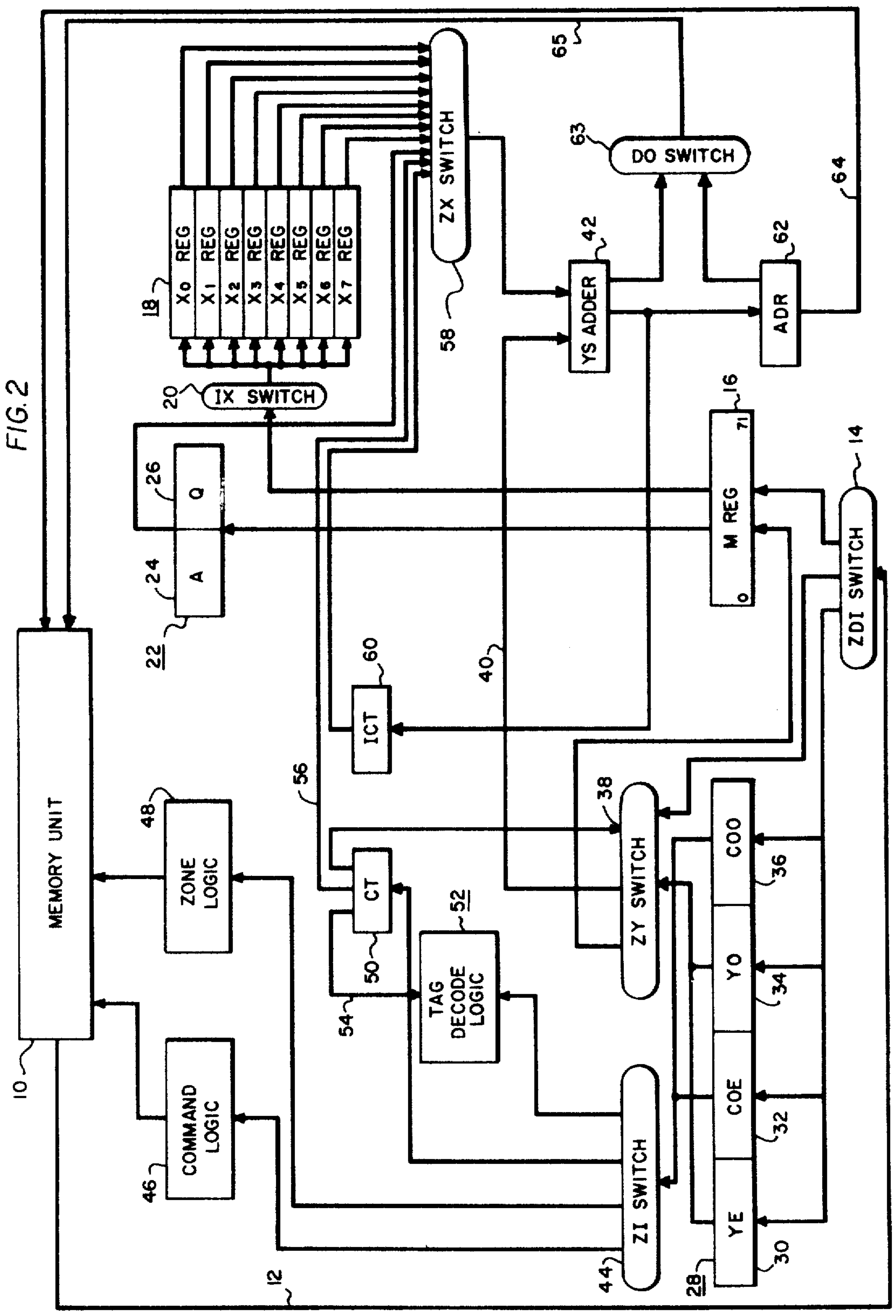

For a better understanding of the invention, reference is made to the accompanying drawings in which:

FIGURE 1 illustrates the format of a typical instruction word used in the present invention; and FIGURE 2 is a major block diagram illustrating the data paths in the system of the present invention.

For a complete description of the system illustrated in FIGURES 1 and 2 and of our invention, reference is made to United States Patent No. 3,425,039, issued to David L. Bahrs et al. on Jan. 28, 1969, and assigned to the assignee of the present invention. More particularly, attention is directed to FIGURES 3 through 20 and to the specification beginning at column 2, line 42, and ending at column 25, line 56, inclusive, of United States Patent No. 3,425,039 which are incorporated herein by reference and made a part hereof as if fully set forth herein.

What is claimed is:

1. In a data processing system, the combination comprising: a memory unit having a plurality of selectively addressable storage locations each containing an information item, certain of said information items each comprising an instruction word containing an address portion, an operation code portion and a tag portion, certain of said other information items comprising an indirect word containing an address portion and a tag portion prescribing a numerical quantity; means for retrieving an instruction word from said memory unit; means responsive to the address and tag portions of said instruction word for retrieving an indirect word from said memory unit; means responsive to said tag portion of said instruction word for varying the address portion of said indirect word by the quantity specified by the tag portion of said indirect word to provide a modified address; means for storing said modified address and said tag portion of said indirect word into the location specified by the address portion of said instruction word; and means for providing subsequent accessing of the memory unit at a storage location dependent upon the address portion of said indirect word to thereby enable the performance of an operation on an information item in accordance with the operation code portion of said instruction word.

2. In a data processing system, the combination comprising: a memory unit having a plurality of selectively addressable storage locations each containing an information item, certain of said information items each comprising an instruction word containing an address portion, an operation code portion, and a tag portion, certain of said other information items comprising an indirect word containing an address portion and a tag portion refining a numerical quantity; means for retrieving an instruction word from said memory unit; means responsive to the address and tag portions of said instruction word for retrieving an indirect word from said memory unit; means responsive to said tag portion of said instruction word for adding the quantity defined by said tag portion of said indirect word to the address portion of said indirect word to provide a modified indirect word address; means for storing said modified indirect word address and said tag portion of said indirect word into the location specified by the address portion of said instruction word; and means responsive to said address portion of said indirect word to provide a subsequent accessing of the memory unit at the storage location specified by the address portion of said indirect word to thereby permit the performance of an operation on an information item in accordance with the operation code portion of said instruction word.

3. In a data processing system, the combination comprising: a memory unit having a plurality of selectively addressable storage locations each containing an information item, certain of said information items each comprising an instruction word containing an address portion, an operation code portion, and a tag portion, certain of said other information items comprising an indirect word containing an address portion and a tag portion defining a numerical quantity; means for retrieving an instruction word from said memory unit; means responsive to the address and tag portions of said instruction word for retrieving an indirect word from said memory unit; means responsive to said tag portion of said instruction word for subtracting the quantity defined by said tag portion of said indirect word from the address portion of said indirect word to provide a modified indirect word address; means for storing said modified indirect word address and said tag portion of said indirect word into the location specified by the address portion of said instruction word; and means responsive to said modified indirect word address to provide a subsequent accessing of the memory unit, said subsequent accessing enabling the performance of an operation on an information item in accordance with the operation code portion of said instruction word.

4. In a data processing system, the combination comprising: a memory unit having a plurality of selectively addressable storage locations each containing an information item, certain of said information items comprising instruction words, each of said instruction words containing an address portion defining one of said addressable storage locations, an operation code portion defining an operation to be performed with respect to an information item, and a tag portion defining a modification type, certain other of said instruction items comprising indirect words each containing an address portion defining one of said addressable storage locations, a tally portion containing a prescribable numerical value, and a tag portion defining a numerical quantity; means for retrieving an instruction word from said memory unit; means responsive to the address and tag portions of said instruction word for retrieving an indirect word from said memory unit; means for varying the numerical value of said tally portion with each accessing of said indirect word to provide a modified tally portion; indicating means responsive to a prescribed value of said tally portion for providing an output signal in designation thereof; means responsive to said instruction word for varying the address portion of said indirect word by the quantity specified by the tag portion of said indirect word to provide a modified indirect word address; means for storing said modified indirect word address, said modified tally portion and said tag portion of said indirect word into said memory unit at the address location specified by the address portion of said instruction word; and means for providing a subsequent accessing of said memory unit at a storage location dependent upon the address portion of said indirect word to thereby enable the performance of an operation on an information item in accordance with the operation code portion of said instruction word.

5. In a data processing system, the combination comprising: a memory unit having a plurality of selectively addressable storage locations each containing an information item, certain of said information items comprising instruction words, each of said instruction words containing an address portion defining one of said addressable storage locations, an operation code portion defining an operation to be performed with respect to an information item, and a tag portion defining a modification type, certain other of said instruction items comprising indirect words each containing an address portion defining one of said addressable storage locations, a tally portion containing a prescribable numerical value, and a tag portion defining a numerical quantity; means for retrieving an instruction word from said memory unit; means responsive to the address and tag portions of said instruction word for retrieving an indirect word from said memory unit; means to decrement the numerical value of said tally portion with each accessing of said indirect word to provide a modified tally portion; indicating means responsive to a prescribed value of said tally portion for providing an output signal; means responsive to said tag portion of said instruction word for adding the quantity defined by the tag portion of said indirect word to the address portion of said indirect word to provide a modified indirect word address; means for storing said modified address, said modified tally portion and said tag portion of said indirect word into said memory unit at the address location specified by the address portion of said instruction word; and means responsive to said indirect word to provide subsequent accessing of said memory unit at the location specified by the address portion of said indirect word to thereby permit the performance of an operation on an information item in accordance with the operation defined by the operation code portion of said instruction word.

6. In a data processing system, the combination comprising: a memory unit having a plurality of selectively addressable storage locations each containing an information item, certain of said information items comprising instruction words, each of said instruction words containing an address portion defining one of said addressable storage locations, an operation code portion defining an operation to be performed with respect to an information item, and a tag portion defining a modification type, certain other of said instruction items comprising indirect words each containing an address portion defining one of said addressable storage locations, a tally portion containing a prescribable numerical value, and a tag portion defining a numerical quantity; means for retrieving an instruction word from said memory unit; means responsive to the address and tag portions of said instruction word for retrieving an indirect word from said memory unit; means to increment the numerical value of said tally portion with each accessing of said indirect word to provide a modified tally portion; indicating means responsive to a prescribed value of said tally portion for providing an output signal; means responsive to said tag portion of said instruction word for subtracting the quantity defined by the tag portion of said indirect word from the address portion of said indirect word to provide a modified indirect word address; means for storing said modified address, said modified tally portion and said tag portion of said indirect word into said memory unit at the address location specified by the address portion of said instruction word; and means responsive to said modified indirect word address to provide a subsequent accessing of said memory unit, said subsequent accessing enabling the performance of an operation on an information item and in accordance with the operation defined by the operation code portion of said instruction word.

7. In a data processing system, the combination comprising: a data processing unit; a memory unit having a plurality of addressable storage locations each containing an information item, certain of said information items comprising instruction words, each of said instruction words containing an address portion specifying a particular one of said storage locations, an operation code portion defining an operation to be performed upon an information item, and a tag portion defining an address modification type, certain other of said information items comprising indirect words, each of said indirect words containing an address portion specifying a particular one of said storage locations, a tally portion comprising a prescribable numerical value and a tag portion defining a numerical quantity; means for bringing an instruction word to said data processing unit from said memory unit; means responsive to the address and tag portions of said instruction word for bringing an indirect word specified by the address portion of said instruction word from said memory unit to said data processing unit; means for varying the tally portion of said indirect word by a prescribed amount with each accessing of said indirect word to provide a modified tally portion; means responsive to a prescribed value of said tally portion for providing an output signal; means responsive to said instruction word for modifying the address portion of said indirect word by the quantity defined by the tag portion of said indirect word to provide a modified indirect word address; means for storing said modified indirect word address, said modified tally portion and said tag portion of said indirect word into the storage location of said memory unit specified by the address portion of said instruction word; and means for providing a subsequent accessing of said memory unit at a storage location dependent upon the address portion of said indirect word, said subsequent accessing enabling an operation upon the information item thus accessed in accordance with the operation code portion of said instruction word.

8. In a data processing system, the combination comprising: a data processing unit; a memory unit having a plurality of addressable storage locations each containing an information item, certain of said information items comprising instruction words, each of said instruction words containing an address portion specifying a particular one of said storage locations, an operation code portion defining an operation to be performed upon an information item, and a tag portion defining an address modification type, certain other of said information items comprising indirect words, each of said indirect words containing an address portion specifying a particular one of said storage locations, a tally portion comprising a prescribable numerical value and a tag portion defining a numerical quantity; means for bringing an instruction word to said data processing unit from said memory unit; means responsive to the address and tag portions of said instruction word for bringing an indirect word specified by the address portion of said instruction word from said memory unit to said data processing unit; means for decrementing the value of said tally portion with each accessing of said indirect word to provide a modified tally portion; means responsive to a prescribed value of said tally portion to provide an output signal; means responsive to said tag portion of said instruction word for adding the quantity defined by the tag portion of said indirect word to the address portion of said indirect word to provide a modified indirect word address; means for storing said modified address, said modified tally portion and said tag portion of said indirect word into the storage location of said memory unit specified by the address portion of said instruction word; and means responsive to the address portion of said indirect word to provide a subsequent accessing of said memory unit at the location specified by the address portion of said indirect word, said subsequent accessing enabling an operation upon the information item thus accessed in accordance with the operation code portion of said instruction word.

9. In a data processing system, the combination comprising: a data processing unit; a memory unit having a plurality of addressable storage locations each containing an information item, certain of said information items comprising instruction words, each of said instruction words containing an address portion specifying a particular one of said storage locations, an operation code portion defining an operation to be performed upon an information item, and a tag portion defining an address modification type, certain other of said information items comprising indirect words, each of said indirect words containing on address portion specifying a particular one of said storage locations, a tally portion comprising a prescribable numerical value and a tag portion defining a numerical quantity; means for bringing an instruction word to said data processing unit from said memory unit; means responsive to the address and tag portions of said instruction word for bringing an indirect word specified by the address portion of said instruction word from said memory unit to said data processing unit; means for incrementing the value of said tally portion with each accessing of said indirect word to provide a modified tally portion; means responsive to a prescribed value of said tally portion to provide an output signal; means responsive to said tag portion of said instruction word for subtracting the quantity defined by the tag portion of said indirect word from the address portion of said indirect word to provide a modified indirect word address; means for storing said modified address, said modified tally portion of said tag portion of said indirect word into the storage location of said memory unit specified by the address portion of said instruction word; and means responsive to said modified indirect word address to provide a subsequent accessing of said memory unit at the storage location thereby, said subsequent accessing enabling an operation upon the information item thus accessed in accordance with the operation code portion of said instructor word.

10. In a data processing system of the type including a memory unit having a plurality of selectively addressable storage locations each containing an information item, a data processing unit for acting upon selected ones of said information items, and means interconnecting said memory and data processing units whereby selected ones of said information items can be transferred therebetween, the improvement comprising: certain of said information items comprising instruction words, each of said instruction words containing an address portion defining one of said addressable storage locations, an operation code portion defining an operation to be performed with respect to an information item, and a tag portion defining a modification type; certain other of said instruction items comprising indirect words each containing an address portion defining one of said addressable storage locations and a tag portion defining a numerical quantity; means for bringing an instruction word from said memory unit to said data processing unit; means responsive to the address and tag portions of said instruction word for bringing an indirect word from said memory unit to said data processing unit; means within said data processing unit for varying the address portion of said indirect word, in response to said instruction word, by the quantity specified by the tag portion of said indirect word to provide a modified indirect word address; means for storing said modified indirect word address and said tag portion of said indirect word into said memory unit at the address location specified by the address portion of said instruction word; and means for providing a subsequent accessing of said memory unit at a storage location dependent upon the address portion of said indirect word to thereby enable the performance of an operation on an information item in accordance with the operation code portion said instruction word.

11. In a data processing system of the type including a memory unit having a plurality of selectively addressable storage locations each containing an information item, a data processing unit for acting upon selected ones of said information items, and means interconnecting said memory and data processing units whereby selected ones of said information items can be transferred therebetween, the improvement comprising: certain of said information items comprising instruction words, each of said instruction words containing an address portion specifying a particular one of said storage locations, an operation code portion defining an operation to be performed upon an information item, and a tag portion defining an address modification type; certain other of said information items comprising indirect words, each of said indirect words containing an address portion specifying a particular one of said storage locations, a tally portion comprising a prescribable numerical value and a tag portion defining a numerical quantity; means for bringing an instruction word to said data processing unit from said memory unit; means responsive to the address and tag portions of said instruction word for bringing an indirect word specified by the address portion of said instruction word from said memory unit to said data processing unit; means within said data processing unit for varying the tally portion of said indirect word with each accessing of said indirect word to provide a modified tally portion; means within said data processing unit responsive to the value of said tally portion to provide an output signal; further means within said data processing unit responsive to said instruction word for modifying the address portion of said indirect word by the quantity defined by the tag portion of said indirect word to provide a modified indirect word address; means for storing said modified indirect word address, said modified tally portion and said tag portion of said indirect word into the storage location of said memory unit specified by the address portion of said instruction word; and means for providing a subsequent accessing of said memory unit at a storage location dependent upon the address portion of said indirect word, said subsequent accessing enabling an operation upon the information item thus accessed in accordance with the operation code portion of said instruction word.

References Cited

UNITED STATES PATENTS

| | | | |
|---|---|---|---|
| 3,036,773 | 5/1962 | Brown | 235—157 |
| 3,222,649 | 12/1965 | King | 340—172.5 |

PAUL J. HENON, *Primary Examiner.*

I. S. KAVRUKOV, *Assistant Examiner.*